United States Patent [19]
Alfio

[11] 4,450,757
[45] May 29, 1984

[54] AUTOMATIC MACHINE FOR COOKING SOUP-PASTE, RICE, POT HERBS OR OTHER FOOD-STUFFS IN WATER

[75] Inventor: Po Alfio, Mantegna-Carpi, Italy

[73] Assignee: Angelo Po Grandi Impianti S.p.A., Carpi, Italy

[21] Appl. No.: 419,838

[22] Filed: Sep. 20, 1982

[51] Int. Cl.³ .................................. A47J 27/18
[52] U.S. Cl. .................................. 99/327; 99/330; 99/336; 99/407; 99/408; 126/374; 126/380
[58] Field of Search .............. 99/325, 326, 327, 330, 99/334, 335, 336, 407, 403, 408; 126/380, 386, 385, 374

[56] References Cited

U.S. PATENT DOCUMENTS

| | | | |
|---|---|---|---|
| 1,118,471 | 11/1914 | Carlton | 99/336 X |
| 1,942,132 | 1/1934 | Blinn | 126/380 X |
| 2,027,146 | 1/1936 | Bly | 99/407 X |
| 2,287,396 | 6/1942 | Roth | 99/403 X |
| 2,578,129 | 12/1951 | Daugherty | 99/408 |
| 2,812,254 | 11/1957 | Smith | 99/330 X |
| 3,107,601 | 10/1963 | Longmire | 99/408 X |
| 3,788,302 | 1/1974 | Malaney | 99/330 X |

FOREIGN PATENT DOCUMENTS 2832659  2/1979  Fed. Rep. of Germany ........ 99/407
2063654  6/1981  United Kingdom .................. 99/407

Primary Examiner—Billy J. Wilhite
Attorney, Agent, or Firm—McAulay, Fields, Fisher, Goldstein & Nissen

[57] ABSTRACT

An automatic machine for cooking food such as soup-paste, rice or pot herbs, in which a support structure with a base and an upper working plane is provided with an open cooking tank contained within the support structure above the base and below the working plane, a water entry duct and an exit overflow duct is provided, water is supplied to the tank at a predetermined temperature, and a water circulation is associated with the tank and housed within the support structure for circulating cooking water at a predetermined temperature through the tank for intermixing with the water supplied by the water supply to the tank, and the temperature of the water in the tank is maintained at a predetermined temperature while the level of the cooking water is maintained at a predetermined level and the water is forced to exit through the overflow duct for the removal from the cooking water in the tank of particles suspended in the water such as starch and scums through the overflow duct.

10 Claims, 4 Drawing Figures

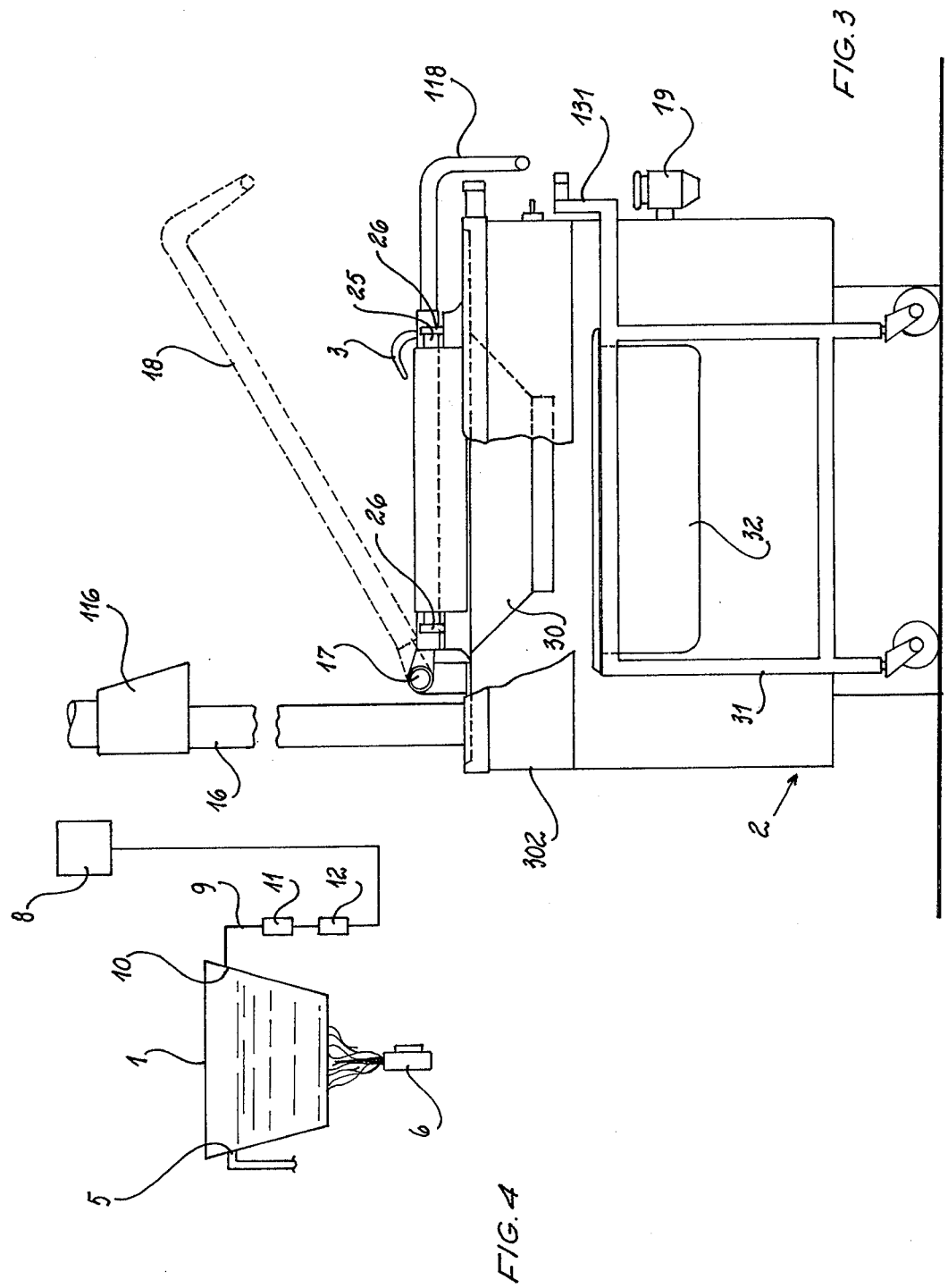

AUTOMATIC MACHINE FOR COOKING SOUP-PASTE, RICE, POT HERBS OR OTHER FOOD-STUFFS IN WATER

BACKGROUND OF THE INVENTION

This invention relates to an automatic cooking machine particularly fit for cooking soup-paste, rice, pot herbs or other food-stuffs in water.

In comparison with previous inventions in the art, the present invention is characterized by the following features: unique means for a selective and automatic control of the cooking time; means for the elimination of starch, scums or other unwanted matter from a cooking tank during an operation of the machine cycle and on command; means for lifting a basket having through openings which is suited for food so that water which impregnates the food passes through the openings; and controls for inverting the basket containing cooked food for placement of the cooked foot into a hopper for food collection and distribution in a basin.

SUMMARY OF THE INVENTION

A primary object of the invention is to provide an automatic machine with means for the removal of all starch and scums from a cooking basket as to permit the foot to be cooked steadily in water while continuously regimented.

Another object of the invention is to provide for the selective and automatic control of the cooking time.

Still another object of the invention is to provide for the automatic lifting, upon completion of the operating cycle, of the basket containing the cooked foods above the cooking tank so that any water still impregnating the food drops away.

A further object of the invention is to provide controls for inverting the basket containing the cooked food above a hopper fitted beside the machine and below which a basin is positioned on a carriage for collection and distribution of the food.

To these ends, the present invention consists in the provision of an automatic machine for cooking food such as soup-paste, rice or pot herbs, comprising an open cooking tank contained within a support structure above the base thereof and below the working plane thereof and having an overflow duct, means for supplying water to the tank at a predetermined temperature and water circulation means associated with the tank and housed within the support structure for circulating cooking water at a predetermined temperature through the tank for intermixing with the water supplied by the water supply means and maintaining the temperature of the water in the tank at a predetermined temperature while maintaining the level of the cooking water at a predetermined level and forcing the water to exit through the overflow duct for the removal from the cooking water in the tank of particles suspended in the water such as starch and scums through the overflow duct.

The water circulation means comprises an outer generator for supplying hot water within a given temperature range of 60°–80° C., at least one burner for heating water in the tank, an entry duct located at an upper position of the tank for supplying hot water to the tank from the generator, the entry duct being at the same level as the overflow duct, an electrical valve for regulating the opening of the duct for controlling the quantity of flow of hot water into the tank and a capacity variator coupled with the electrical valve providing for micrometric regulation of the opening of the duct.

The overflow duct is positioned below and opposed to the entry duct whereby the overflow duct keeps the water level in the cooking tank constant thereby removing the starches and scums from the cooking tank by circulating water from the entry duct through the tank and out of the tank through the overflow duct.

A movable basket is pivotally supported on the working plane for positioning in its cooking position in the tank. A hopper is supported by the support structure, pivoting means being provided for the movable basket supported on the upper working plane of the support structure between the hopper and the tank, the pivoting means includes a pair of levers having one end connected with the movable basket and the other end connected with a rotatable shaft, and removal means is associated with the pivoting means and the basket for removal thereof from the tank, and the basket is pivoted about the pivoting means to invert the basket for emptying the contents thereof into the hopper.

A control is provided for activating the water circulation circuit.

A timing mechanism and removal means is located on the support structure responsive to a pre-set timer for automatically removing food-stuffs at end of a cooking cycle.

In order to remove the cooked food from the cooking tank, a hopper is provided which is carried by the support structure, two pivotable parallel levers are pivoted on the support structure having one end pivotally connected with the support structure and another end connected with a basket having holes for releasing water therethrough, a set of pinions affixes the one end of the levers to the support structure, a connector affixes the other end of the levers to the basket, and a motor reducer with a reversible rotation and a chain connecting the motor reducer with the pinions is provided, the motor reducer which when activated by the control causes the basket to be lifted by the levers out of the cooking tank and inverted for releasing the contents thereof into the hopper. A basin is positioned centrally below the hopper and supported on top of a movable distribution carriage, the basin receiving the food-stuffs deposited thereinto by the hopper, and means associated with the distribution carriage for removal thereof from the support structure.

Other features, advantages and the nature of the invention will become readily apparent from the following description of a preferred embodiment of the invention as illustrated in connection with the accompanying drawings.

BRIEF DESCRIPTION OF THE DRAWINGS

FIG. 3 is a side elevation view of the invention in operation; and

FIG. 4 schematically illustrates the water regeneration circuit for the continuous regeneration of water in the cooking tank.

DETAILED DESCRIPTION OF THE PREFERRED EMBODIMENT

Figure 1:
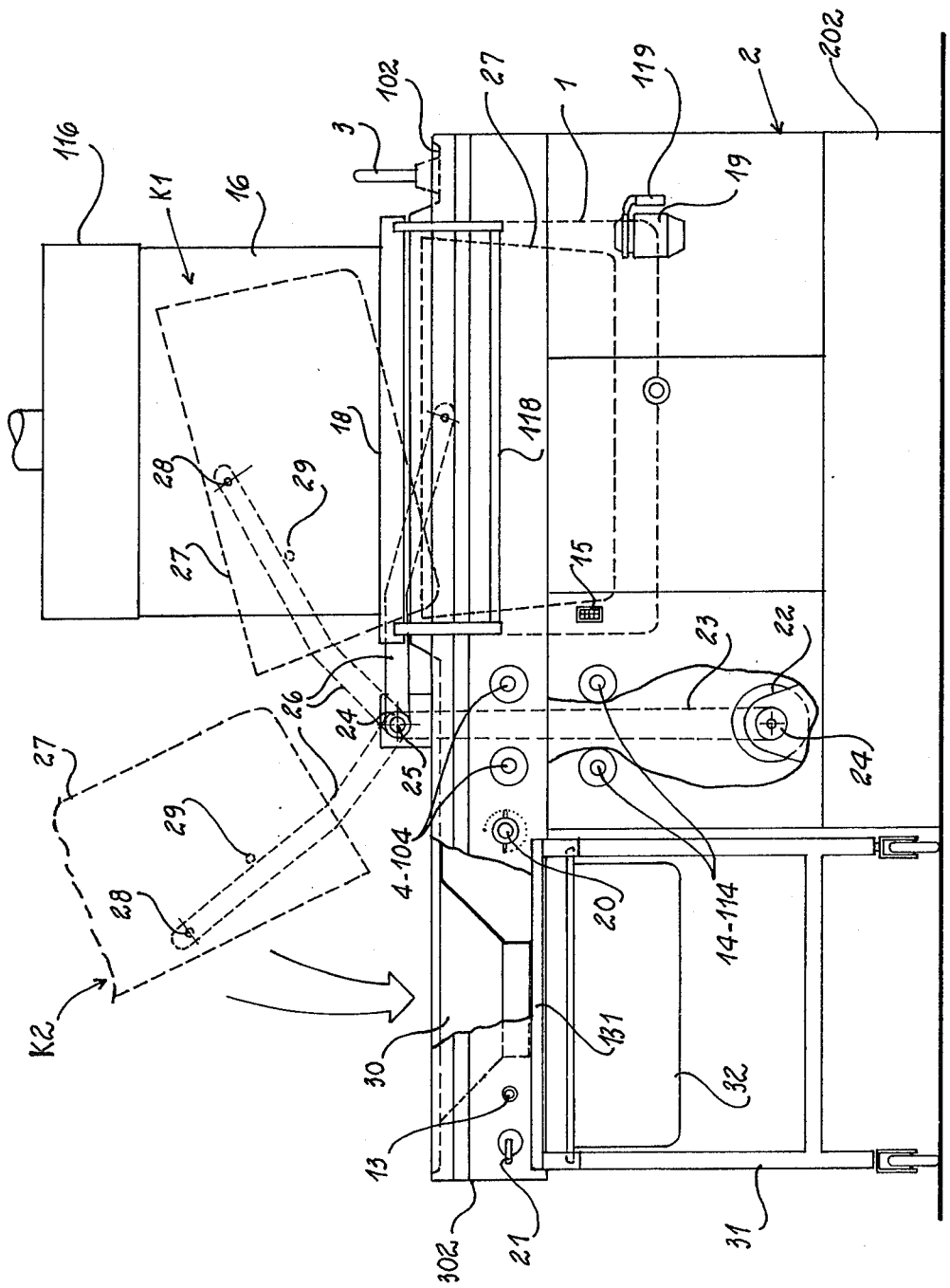
FIG. 1 is a partial schematic front elevation view of the invention in operation, with parts broken away to explain the operation.
Figure 2:
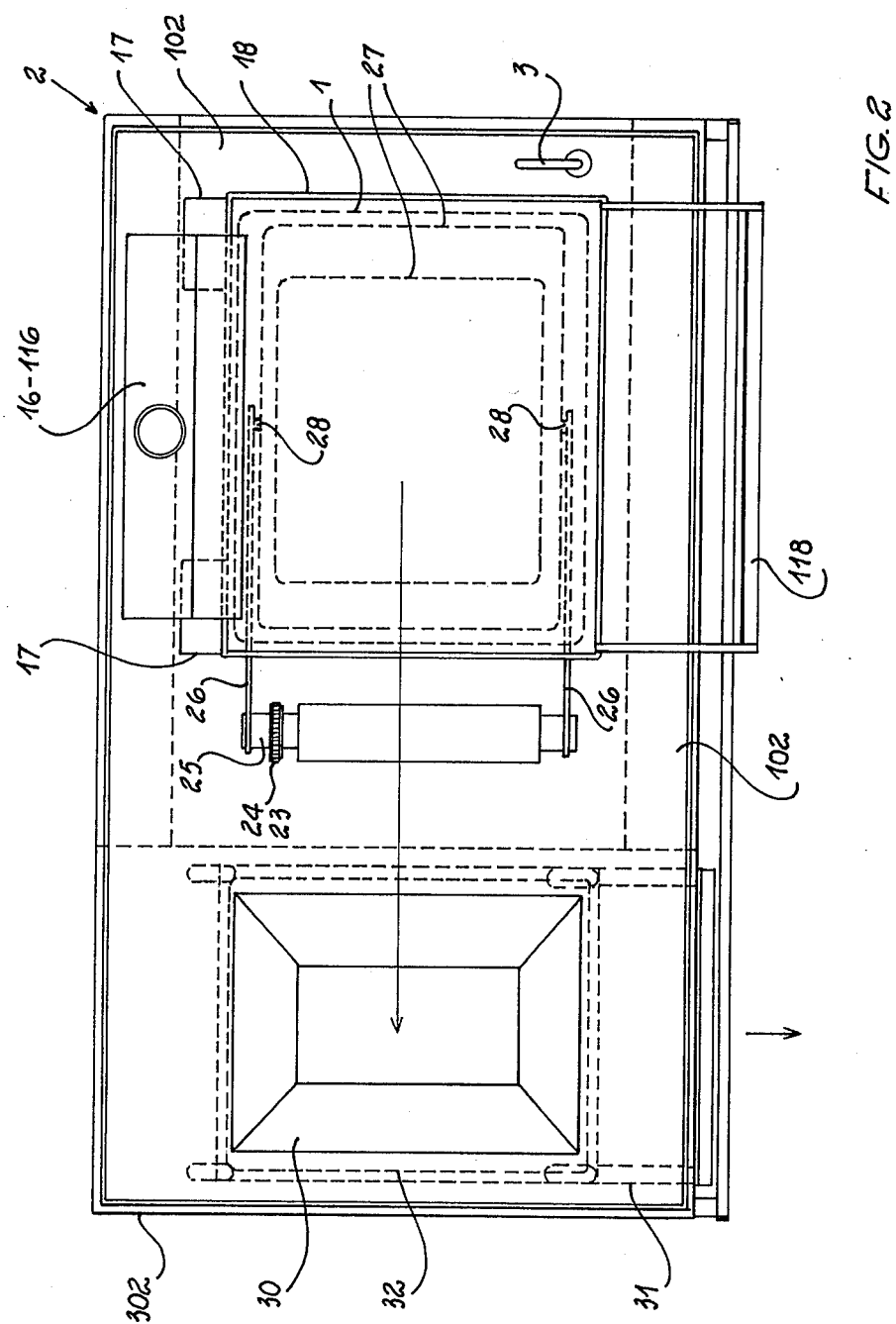
FIG. 2 is a partial schematic top plan view of the invention in operation.

Referring to the drawings which illustrates the best mode presently contemplated for carrying out the invention, and in particular to FIGS. 1 and 2 it can be seen that the machine according to the invention includes an open tank 1, with proper form and capacity, supported by an especially careened or support structure having an upper working plane 102 provided with a liquid dropper and drain and an articulated assembly 3 for the introduction into tank 1 of hot or cold water or a mixture thereof. Special cut cocks 4, 104 may suitably be fitted for instance on the front side of the structure 2. Structure 2 is provided with a base 202 to enclose the inlet and drain pipe. This provides for the appropriate safety devices as well as assuring the best hygiene conditions.

Referring to FIG. 4, which shows the water supply to the upper part of tank from an outer generator 8 and at least one free draining or overflow duct or spillway 5, in order to maintain the water at a constant predetermined level in the tank. In order to maintain the temperature of the water in tank 1 or to control the temperature of the water in tank 1, one or more burners 6 is provided to heat air beneath the tank and thereby heat the tank. In order to supply hot water to tank 1 at a preselected temperature, the outer generator 8 is provided to supply hot water in the temperature range of for instance 60°-80° C. Generator 8 is connected by means of duct 9 to tank 1 through an upper orifice 10 provided on tank 1. Orifice 10 is preferably positioned opposite overflow device 5 and at a appropriately suitable higher level than overflow device 5. Duct 9 includes in its line a capacity variator 11 which provides for micrometric regulation and an operator controlled electrical valve 12 which opens in response to operator intervention. For this purpose, an outer control 13 (FIG. 1) is provided on the front side of structure 2. Valve 12 is opened only when the tank is closed with a special upper cover, as described hereinafter.

In order to prevent burner or burners 6 from being accidentally turned off thereby extinguishing the flame, known devices having conventional thermocouples and warning lamps are provided which can be adjusted by means of special cocks provided with valves 14, 114 which are fitted on the front side of structure 2, together with a control 15 connected with electrical firing devices of the type with "spark train for kindling the above burners." Chimney 16 is associated with burners 6 to convey smoke and combustion products produced by burners 6 away from structure 2. Chimney 16 may be provided, if desired, with a mitre 116 or upper hood.

A cover 18 for tank 1 is provided which is connected with a pivot or fulcrum that is held at holder 17 and in correspondence with chimney 16 on top plane 102 of structure 2; the cover 18 is provided with a large athermic handgrip 118 and is self-balanced by means of spring-balanced articulation hinges.

As best seen in FIG. 1, a special drain cock 19 is positioned for draining, by gravity, the liquid contained in tank 1. Timer control 20 is provided to control a timer to program the cooking time as described hereinafter, and at least another control or motor control 21 is fitted on the front side of structure 2 for activating a speed reducer 22 with a double rotation sense; reducer 22 is appropriately mounted in a proper position inside structure 2. The motor reducer 22 is connected by means of chain 23 and pinion 24 to a turning and horizontally supported shaft 25 on the upper working plane or surface 102 of structure 2, and in an orthogonal position with respect to the pivot (or articulation axle) of cover 18. Two parallel levers 26 are provided which have a first portion connected with basket 27 and a second portion having an end articulated to for rotation about shaft 25. These levers have an appropriate angular relationship with shaft 25 and basket 27 for movement thereof as explained hereinafter. When the machine is operated, these levers 26 are positioned partly in tank 1 to support basket 27. The food which is to be cooked is placed into basket 27 which is provided with through openings or bores 40. Connection 28 of lever 26 is fitted with suitable connection-disconnect devices so as to easily and quickly replace the basket with another basket with proper bores according to the type of food which is to be cooked. Basket 27 is moreover fitted with one or more side retainer(s) 29 which keeps it correctly positioned with respect to the lever 26.

In counterposition to tank 1 and on a horizontal plane intersecting the oscillation orbit of lever 26 of the basket, the machine has a hopper 30 projecting onto structure 2 such that a carriage 31 with basin 32 can be positioned under it. Hopper 30 and basket 26 are so related that when basket 26 is moved from its horizontal position which substantially coincides with the horizontal position of hopper 30, and rotated about an axis which substantially coincides with the axis of shaft 25, the contents of basket 27 can be emptied into hopper 30. As best seen in FIGS. 1 and 3, carriage 31 is fitted with a handgrip 131 which is partially turned upwards and cooperates with the front side of careen 302 on which hopper 30 is positioned and ensures that the basin 32 is centered below hopper 30.

The machine includes a conventional control board with programming circuits and safety devices which are not shown in detail as they can be easily designed and carried out by any technician familiar with conventional control circuitry.

At the beginning of the working cycle, the machine is in the position and condition depicted in FIG. 1, except that cover 18 is properly lifted. Tank 1 is first filled with water through articulated assembly 3 and hot and cold water controls 4, 104 and water is brought to the preselected temperature by means of the burners 6 controlled by controls 14, 114 and 15. When the water is at the pre-selected temperature, generally a warm temperature, the food to be cooked is introduced into bored basket 27 which is positioned inside tank 1. Control 20 which controls a conventional timer is acted on in order to preset the time required for cooking the food. Cover 18 is then lowered, and the burner heat is provided in the desired amount by means of controls 14, 114; and, if required, a regeneration water circuit is activated by means of control 13.

As noted from the circuitry of FIG. 4, when electrical valve 12 is opened, a correct quantity of hot water is fed into tank 1 and is properly regulated by means of capacity variator 11. Excess water exits from tank 1 through opening or spillway 5 and determines the drain of the parts in suspension such as starch and scums. The food can then be cooked in water which is steadily regenerated with consequent advantages.

At the end of the cooking cycle, the timer previously activated by means of control 20 automatically controls the activation of motor reducer 22 which through the various mechanisms 23, 24, 25 and 26, causes basket 27 to be lifted with it's bottom substantially at the same height as the plane 102 of tank 1 as shown in FIG. 1 by K1 and dashed lines. The cooked food contained in basket 27 is thus permitted to have the water it is still impregnated with drip and fall into tank 1. At the same time or in correct phase with the dripping of water into tank 1, the efflux of regenerated water is stopped, the burners are quenched, if required, and at least one acoustic signal is activated warning the operator that the cooking cycle is completed. At this point, the operator intervenes and operates control 21 for activating motor reducer 22 so as to move basket 27 and pass it from the K1 position into K2 position to overturn or upset basket 27 and empty the contents thereof above and into hopper 30. The food falls into the hopper which centers it into basin 32 on the distribution carriage 31.

The machine according to the invention can also be used for cooking food-stuffs different from those previously mentioned whether liquid or requiring liquid to be added. If liquid is to be added this is placed into tank 1 without basket 27, and the water regeneration circuit as disclosed in FIG. 4 is not activated. The liquid which is boiled in tank 1 can be quickly removed therefrom through front cock 19 which is fitted with an athermic grip 119.

The automatic machine particularly suitable for cooking soup-paste, rice, pot herbs and other foodstuffs, and means are provided with at the end of a preset cooking period which is preset by means of a special timer, the basket containing the cooked food and positioned in the cooking tank is automatically lifted above the same tank so that it drips the still impregnating water while at the same time a warning means is activated to inform the operator of the end of the cooking cycle.

A special hand-activated control is provided which preferably acts on the same means as used for the lifting of the basket from the cooking tank so as to permit the inverting or upsetting of the basket containing the food above a hopper which is fitted beside the tank. Below the hopper, a basin is positioned on a carriage for collecting the cooked food, so that the food can be quickly removed from the machine.

Further, water feed means is provided so that during the cooking cycle, hot water can be provided at a correct temperature and in adjustable quantity into the upper part of the cooking tank with a view to having the suspended parts, such as scums, starches or other, removed from the tank through the outflow therefrom, so as to obtain food cooked in water which is both constantly circulated or regenerated and clean with the relevant advantages.

While there has been shown and described what is considered to be the preferred embodiments of the present invention, it will be obvious to those skilled in the art that various changes and modifications may be made therein without departing from the scope of the invention.

I claim:

1. An automatic machine for cooking food including soup-paste, rice or pot herbs, comprising:
   a support structure having a base and an upper working plane;
   an open cooking tank contained within said support structure above said base and below said working plane having an overflow duct;
   a movable basket pivotally supported on said working plane;
   water supply means for supplying water to said tank at a predetermined temperature;
   at least one burner for heating water in said tank;
   water circulation means associated with said tank and housed within said support structure for circulating cooking water at a predetermined temperature through said tank for intermixing with the water supplied by said water supply means and maintaining the temperature of the water in said tank at a predetermined temperature while maintaining the level of the cooking water at a predetermined level and forcing the water to exit through said overflow duct, for the removal of the cooking water in said tank, of particles suspended in the water including starch and scums through said overflow duct.

2. The machine as claimed in claim 1, wherein said water circulation means comprises:
   an outer generator for supplying hot water within a given temperature range of 60°-80° C.;
   an entry duct located at an upper position of said tank for supplying hot water to said tank from the generator, said entry duct being at a lower level as said overflow duct;
   an electrical valve for regulating the opening of said duct for controlling the quantity of flow of hot water into said tank;
   a capacity variator coupled with said electrical valve providing for micrometric regulation of the opening of said duct.

3. The machine as claimed in claim 2 further comprising:
   a chimney for discharging combustion smoke resulting from said burner.

4. The machine as claimed in claim 2 wherein said overflow duct is positioned above and opposed to said entry duct whereby said overflow duct keeps the water level in said cooking tank constant thereby removing the starches and scums from the cooking tank by circulating water from said entry duct through said tank and out of said tank through said overflow duct.

5. The machine as claimed in claim 1 including:
   a hopper supported by said support structure;
   pivoting means for said movable basket supported on said supper working plane of said support structure between said hopper and said tank;
   said pivoting means including a pair of levers having one end connected with said movable basket and the other end connected with a rotatable shaft; and
   removal means associated with said pivoting means and said basket for removal thereof from said tank, and pivoting of said basket about said pivoting means to invert said basket for emptying the contents thereof into said hopper.

6. The machine as claimed in claim 5 including:
   a control for activating the water circulation circuit;
   a cover for said cooking tank with a athermic handgrip located at the fulcrum of the cover; and
   said water supplying means including special cocks located on said support structure for the introduction of a predetermined mixture of hot and cold water into said cooking tank.

7. The machine as claimed in claim 1 which comprises:
   a timing mechanism and removal means located on said support structure responsive to a pre-set time for automatically removing food-stuffs at end of a cooking cycle.

8. The machine as claimed in claim 7 wherein said timing mechanism comprises:
a timer for timing the cooking cycle;
a control for presetting said timer; and
a motor operatively controlled by said timer.

9. The machine as claimed in claim 8, wherein said removal means includes:
a hopper carried by said support structure;
two pivotable parallel levers having one end pivotally connected with said support structure and another end connected with said basket;
a set of pinions for affixing said one end of said levers to said support structure;
connection means for affixing said other end of said levers to said basket; and
a motor reducer with a reversible rotation and a chain connecting said motor reducer with said pinions, said motor reducer which, when activated by said control, causes said basket to be lifted by said levers out of said cooking tank and inverted for releasing the contents thereof into said hopper.

10. The machine as claimed in claim 9, including:
a movable distribution carriage;
a basin positioned centrally below said hopper and supported on top of said movable distribution carriage, said basin receiving the food-stuffs deposited thereinto by said hopper; and
means associated with said distribution carriage for removal thereof from said support structure.

* * * * *